United States Patent Office 3,321,177
Patented May 23, 1967

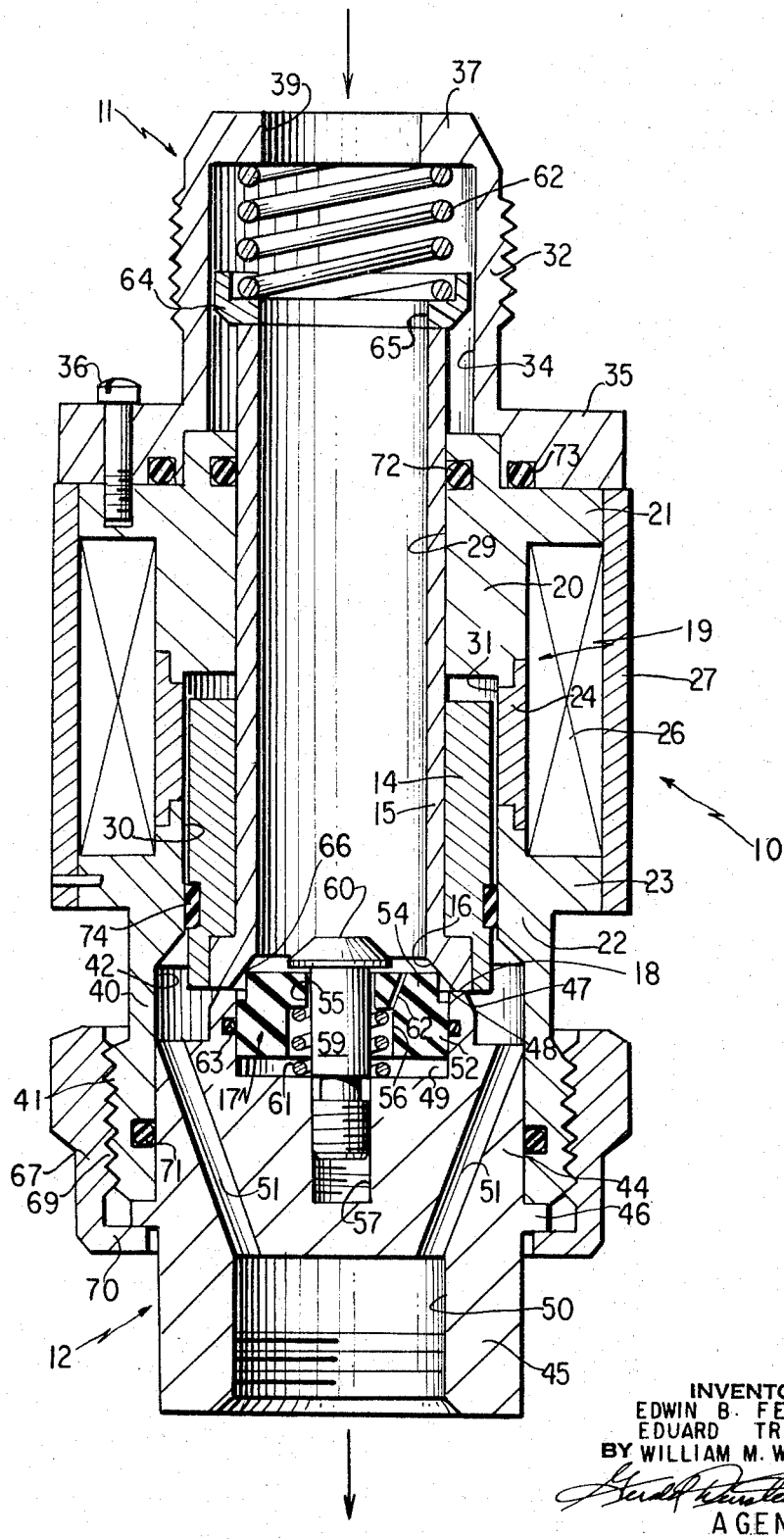

3,321,177
VALVE FOR FLUID MEDIUM UNDER PRESSURE
Edwin B. Fendel, East Orange, Eduard Treirat, Nutley, and William M. Weibel, Pompton Lakes, N.J., assignors to Specialties Development Corporation, Belleville, N.J., a corporation of New Jersey
Filed Aug. 6, 1964, Ser. No. 387,889
10 Claims. (Cl. 251—210)

The present invention relates to valves for fluid medium under pressure, and, more particularly, to face type valves, that is, valves wherein the resilient sealing member and the valve seat face each other and are mounted on bodies one of which moves axially with respect to the other from a spaced position when the valve is open to a position whereat the sealing member and the valve seat abut when the valve is closed.

In such valves, when it is desired that the valve should close rapidly, the moving element, for example, that carrying the valve seat, attains a considerable velocity in moving from the spaced position to the abutting position. When the valve is closed, the valve seat and the resilient sealing member must be in contact. Thus, in previously known valves, the moving element was stopped by the impact of the seat against the sealing member. Since the moving element develops considerable kinetic energy, the sealing member is subjected to considerable impact forces and is subject to dimensional change and damage upon repeated operations. It is necessary therefore that the sealing member have considerable area in contact with the seat so that the impact does not excessively damage the sealing surface and cause leakage.

Since the sealing pressure developed between the seat and the sealing member is equal to the force holding the valve closed divided by the contact area, an increase in contact area requires that the closing force be increased proportionately if an adequate sealing pressure is to be maintained. An increase in the force holding the valve closed requires that a solenoid or other device for operating the valve be stronger and therefore larger and heavier.

Also, when the sealing member is subjected to repeated impact loadings, the sealing surface becomes deformed so that the area sealed off by the sealing member changes and causes the force required to open the valve to change. Thus, in solenoid operated valves wherein a time interval is required for the magnetic field to build up a magnitude sufficient to open the valve, the response time of the valve changes with repeated use. Therefore, it will be seen that in systems wherein the operation of the valve is synchronized with other system components, any change in response time could materially alter the operation of the entire system.

Accordingly, an object of the present invention is to provide a face type valve which is not subjected to the foregoing difficulties.

Another object is to provide such a valve wherein the sealing member is protected against damage resulting from impact upon closing of the valve.

Another object is to provide such a valve which is effective under light loading.

Another object is to provide such a valve wherein the sealing member is not subjected to substantial deformation at the sealing surface after repeated use.

A further object is to provide such a valve which is simple and inexpensive to manufacture and is extremely durable.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention the foregoing objects are accomplished by providing a valve which comprises a first member having an end provided with a cylindrical chamber and an annular surface disposed outwardly of the chamber, a second member having an end provided with a bore for receiving fluid under pressure and formed with a valve seat facing the chamber and with an annular surface disposed outwardly of the seat and in alignment with the annular surface of the first member, means for moving one of the members between a closed position with the annular surfaces in contact and an open position with the surfaces separated, a resilient generally cylindrical valve sealing member slidably mounted in the chamber for cooperating with the valve seat to provide a fluid tight seal when the first and second members are in the closed position, the valve sealing member being movable into the chamber to allow the above mentioned annular surfaces of the first and second members to absorb the energy of the moving body member during the closing of the valve, spring means for urging the valve sealing member towards the valve seat, the second member having inlet port means in fluid flow communication with the bore, and outlet port means in the first member outwardly of the chamber in fluid flow communication with the bore only when the valve is open.

A preferred embodiment of the invention has been chosen for purposes of illustration and description, and is shown in the accompanying drawing, forming a part of the specification, wherein:

The single figure of the drawing is a longitudinal sectional view of a valve according to the present invention.

Referring to the drawing in detail, there is shown a valve according to the present invention which generally comprises an annular solenoid 10, an inlet body member 11 on one end of the solenoid, an outlet body member 12 on the other end of the solenoid, an annular armature 14 within the solenoid, an annular sleeve 15 carried by the armature and having a bore formed with a valve seat 16 and an annular surface 18 at the outlet end thereof, and a valve sealing member 17 slidably mounted in the outlet body member facing the valve seat.

The solenoid 10 includes a spool 19 comprising a first end portion 20 having a flange 21, a second end portion 22 having a flange 23, and a central portion 24, a coil of wire 26 wound about the spool 19 between the flanges 21 and 24, and a sleeve 27 fitted over the flanges to cover the coil 26.

The end portions 20 and 22 of the spool are formed of a magnetizable metal, while the central portion 24 is formed of a nonmagnetizable material to provide a gap in the magnetic circuit. The end portion 20 is provided with a bore 29 dimensioned to receive the sleeve 15 while the end portion 22 and the central portion 24 are provided with bores 30 and 31 respectively which have a larger diameter to receive the armature 14.

The inlet body member 11 includes a tubular section 32 having a bore 34 aligned with the sleeve 15 and of a larger diameter than the sleeve, a flange 35 on one end of the tubular section 32 secured to the flange 21 by a plurality of bolts 36 (only one of which is shown), and a wall section 37 on the other end of the tubular section 32 having an inlet port 39 therein.

The end portion 22 of the spool 19 is provided with a tubular extension 40 having screw threads 41 on the outer surface thereof and having a bore 42 of larger diameter than the bore 30 for receiving the outlet body member 12.

The outlet body 12 is cylindrical and has an inner end portion 44 positioned within the bore 42, and an outer end portion 45 positioned externally of the bore 42. A flange 46 is provided on the outer surface of the body 12 between the inner and outer end portions 44 and 45, and an annular projection 47 formed with an annular surface 48 is provided on the inner end of the body 12 extending toward the downstream end of the sleeve 15 and defining a cylindrical chamber 49. The annular projection 47 is aligned with the sleeve 15 and has an inner diameter which is greater than that of the bore of the sleeve 15 and an outer diameter which is less than that of the bore 42. The outer end portion 45 of the body 12 is provided with an outlet bore 50 and a plurality of passageways 51 extended from the bore 50 through the body 12 to intersect the annular zone of the end surface of the inner end portion 44 outwardly of the projection 47.

The valve sealing number 17 is slidably positioned in the chamber 49 and comprises a cylindrical piece of Teflon having a large diameter section 52 set into the chamber 49 and a smaller diameter end section 54 protruding from the chamber 49 toward the valve seat 16. The valve sealing member 17 is provided with a stepped bore including a small diameter section 55 and a larger diameter section 56. The body 12 is provided with a screw threaded bore 57 extending into the body from the chamber 49 and a bolt 59 having a head 60 which extends through the stepped bore in the member 17 and is threaded into the bore to limit outward movement of the member 17. A coil spring 61 is positioned in the bore section 56 to bias the member toward the valve seat 16. A fluid passageway 62 is provided in the member 17 to allow fluid within the sleeve 15 to act on the rear surface of the member 17, and an O-ring 63 is positioned in the inner wall of the projection 47 to seal against the outer periphery of the section 52 of the member 17.

The sleeve 15 is biased in the valve closing direction by a coil spring 62 acting between the wall 37 of the inlet body member 11 and a cup-shaped member 64 which abuts the upstream end of the sleeve 15 and is provided with a central opening 65 to permit fluid flow from the inlet port 39 into the sleeve 15. The spring 62 holds the outlet end of the sleeve 15 in abutment with the projection 47. The valve seat 16 is conical and slopes inwardly in the upstream direction from the end of the sleeve. The small diameter section 54 of the valve sealing member 17 is preferably formed with a sharp edge 66 to provide a thin line of contact between the valve seat 16 and the member 17. The bolt 59 is adjusted so that, when the valve is open, the spring 56 moves the valve member in the upstream direction a small distance past the position shown in the drawing.

The outlet member 12 is held in place by a tubular sleeve 67 which is provided with screw threads 69 on the inner surface thereof and with an inwardly extending flange 70. The sleeve 67 is threaded onto the tubular extension 40 of the solenoid spool so that the flange 70 holds the flange 46 of the body member 12 firmly against the end of the extension 40.

Three O-ring seals 71, 72, and 73 are provided in the valve to prevent fluid leakage, and an annular Teflon bearing 74 is mounted in the outer surface armature to reduce the friction between the armature and the spool components.

In operation, the valve is connected into a pressurized fluid line and when the solenoid 10 is energized, a magnetic field is produced in the spool assembly which moves the armature 14 against the spool end member 20 to bridge the gap (formed by the non-magnetic spool portion 24) in the magnetic circuit. As the armature 14 moves, the sleeve 15 carried thereby is moved in the upstream direction, against the action of the spring 62, to the valve open position wherein the valve seat 16 is spaced from the valve sealing member 17. Fluid then flows from the inlet port 39 through the sleeve 15, past the member 17, and through the passageways 51 to the outlet bore 50. As the valve seat 16 moves away from the valve sealing member 17 upon opening of the valve, the member 17 moves in the upstream direction under the influence of the spring 61 until it contacts the head 60 of the bolt 59.

To close the valve, the solenoid is de-energized and the spring 62 drives the sleeve 15 in the downstream direction. As the sleeve 15 approaches the closed position, the valve seat 16 contacts the sealing valve member 17 and the member slides into the chamber 49 allowing the sleeve 15 to continue to move unimpeded until its annular surface 18 strikes the annular surface 48 on the projection 47. Therefore, substantially all of the energy of the moving sleeve 15 is absorbed by the projection 47 and the valve sealing member 17 is projected from damage or deformation by virtue of its resilient mounting to provide long life and stability to the valve.

When the valve is closed, the sealing edge 66 of the member 17 is urged against the valve seat 16 by the spring 61 to form a fluid seal. The passageway 62 allows the fluid pressure within the sleeve 15 to be communicated to the portion of the chamber 49 behind the member 17. The fluid pressure behind the valve sealing member 17 acts upon the surface area of its portion 52 while the fluid pressure within the sleeve 15 acts upon the lesser surface area of its portion 54. The valve sealing member 17 is therefore pressure biased toward the valve seat 16 to increase the sealing pressure exerted by the edge 66 against the seat 16.

The simple cylindrical shape of the valve member enables it to be easily machined from a block of Teflon to close tolerances. Also, the combination of the conical valve seat and the sharp edge 66 provides a thin line of contact between the valve sealing member 17 and the seat 16 so that a small loading of the member 17 produces a high sealing pressure.

A valve of the type illustrated utilizing a spring 62 which exerts a force of about 4 pounds and closes the valve in about 7 milliseconds, a spring 61 which exerts a sealing force of about 2 pounds upon the valve member, and a valve sealing member 17 having a diameter of about 0.23 inch at the sealing point and otherwise dimensioned to provide a sealing force of about 4 pounds due to pressure unbalance, has been found to have substantially zero leakage after one million complete operations of the valve in a system handling gaseous nitrogen at 500 p.s.i.

From the foregoing description, it will be seen that the present invention provides a simple, inexpensive and durable valve construction wherein the sealing member is effective under light loading and is protected from impact forces when the valve closes.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. In a fluid control valve, the combination of a first member having an end provided with a cylindrical chamber and an annular surface disposed outwardly of said chamber, a second member having an end provided with a bore for receiving fluid under pressure and formed with a valve seat facing said chamber and with an annular surface disposed outwardly of said valve seat and in alignment with said annular surface of said first member, means for moving one of said body members between a closed position whereat said annular surfaces are abutting and an open position whereas said annular surfaces are separated, a resilient cylindrical valve sealing member slidably mounted in said chamber for cooperating with said valve seat to provide a fluid tight seal when said members are in said closed position, said valve sealing member being movable into said chamber to allow said annular surfaces to absorb the energy of said moving member during the closing of the valve, spring means for urging the valve sealing member toward said valve seat, and structural means carried by one of said members providing a fluid passageway positioned outwardly of said chamber in fluid flow communication with said bore only when the valve is open.

2. In a valve according to claim 1, including means for conducting fluid medium under pressure in said bore into said chamber behind said valve sealing member to urge said valve sealing member against said seat when the valve is closed, and means for providing a fluid tight seal between said first member and said valve sealing member for preventing the escape of the fluid medium behind said valve sealing member.

3. In a valve according to claim 2, wherein said valve sealing member is stepped to have a small diameter sealing section in front of said last mentioned seal means for contacting said seat and a large diameter section behind said last mentioned sealing section so that when the valve is closed the valve sealing member is pressure biased against said seat.

4. In a fluid control valve, the combination of a valve body having an inlet, an outlet, and a rigid annular projection between said inlet and said outlet formed with an annular surface facing said inlet and providing a chamber; a valve sealing member slidably mounted in said chamber; spring means for urging said sealing member towards said inlet and outwardly of said chamber; means for limiting the outward extent of said valve sealing member; and a member slidably mounted in said body formed with a bore in fluid flow communication at one end with said inlet and having at the other end a valve seat for engaging said valve sealing member and a rigid annular surface surrounding said seat for engaging said first mentioned annular surface.

5. In a valve according to claim 4, including a spring for urging said last mentioned member towards said outlet to close the valve, and means for moving said last mentioned member in the opposite direction with said seat out of contact with said valve sealing member to open the valve.

6. In a fluid control valve, the combination of a first member having an end provided with a cylindrical chamber and an annular surface disposed outwardly of said chamber, a second member having an end provided with a bore providing a first passageway for fluid under pressure and formed with a valve seat facing said chamber and with an annular surface disposed outwardly of said valve seat and in alignment with said annular surface of said first member, means for moving one of said body members between a closed position whereat said annular surfaces are abutting and an open position whereat said annular surfaces are separated, a resilient cylindrical valve sealing member slidably mounted in said chamber for cooperating with said valve seat to provide a fluid tight seal when said members are in said closed position, said valve sealing member being movable into said chamber to allow said annular surfaces to absorb the energy of said moving member during the closing of the valve, spring means for urging the valve sealing member toward said valve seat, and structural means carried by one of said members for providing a second passageway for fluid under pressure positioned outwardly of said chamber in fluid flow communication with said bore only when the valve is open.

7. In a fluid control valve, the combination of a valve body having first port means, second port means, and a rigid annular projection between said ports formed with an annular surface facing said first port providing a chamber; a valve sealing member slidably mounted in said chamber; spring means for urging said sealing member towards said first port and outwardly of said chamber; means for limiting the outward extent of said valve sealing member; and a member slidably mounted in said body formed with a bore in fluid flow communication at one end with said first port and having at the other end a valve seat for engaging said valve sealing member and a rigid annular surface surrounding said seat for engaging said first mentioned annular surface.

8. A valve according to claim 6, including means for conducting fluid medium under pressure from one of said passageways into said chamber behind said valve sealing member to urge said valve sealing member against said seat when the valve is closed.

9. A valve according to claim 8, wherein said valve sealing member is stepped to have a small diameter sealing section for contacting said seat and a large diameter section in said chamber behind said small diameter sealing section so that when the valve is closed the valve sealing member is pressure biased against said seat.

10. In a fluid control valve, the combination of a first member having an end and formed to provide a cylindrical chamber intersecting said end, a second member having an end facing said end of said first member and formed with a bore providing a first passageway for fluid under pressure and formed with a valve seat facing said chamber and in fluid flow communication with said bore, means for moving one of said body members between a closed position and an open position, energy absorbing means including a first annular surface on said first member disposed outwardly of said chamber and a second annular surface formed on said second member outwardly of said valve seat and in alignment with said first annular surface for absorbing the energy of said moving member upon closing of the valve, a resilient cylindrical valve sealing member slidably mounted in said chamber for cooperating with said valve seat to provide a fluid tight seal when said members are in said closed position, said valve sealing member being movable into said chamber to allow said surfaces to absorb the energy of said moving member during the closing of the valve, spring means for urging the valve sealing member toward said valve seat, and structural means carried by one of said members for providing a second fluid passageway positioned outwardly of said chamber to be in fluid flow communication with said bore only when the valve is open.

References Cited by the Examiner

UNITED STATES PATENTS

| | | | |
|---|---|---|---|
| 2,013,860 | 9/1935 | McElwaine | 251—333 X |
| 2,507,262 | 5/1950 | McGivern | 251—341 X |
| 3,255,774 | 6/1966 | Gallagher | 137—516.79 |

M. CARY NELSON, *Primary Examiner.*

R. C. MILLER, *Assistant Examiner.*